United States Patent Office 3,449,364
Patented June 10, 1969

3,449,364
1-p-CHLOROBENZOYL-2-METHYL-5-METHOXY-3-(2'-NITROETHANE)-INDOLE
John Martin Chemerda, Watchung, and Meyer Sletzinger, North Plainfield, N.J., assignors to Merck & Co., Inc., Rahway, N.J., a corporation of New Jersey
No Drawing. Filed July 26, 1967, Ser. No. 656,004
Int. Cl. C07d 27/56
U.S. Cl. 260—326.16     1 Claim

ABSTRACT OF THE DISCLOSURE

This invention relates to a compound of the formula

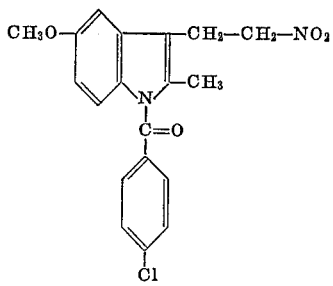

which is useful as an intermediate in the preparation of 1-p-chlorobenzoyl-2-methyl-5-methoxy-3-indolylacetic acid.

---

This invention relates to a new method of preparing a certain 1-benzoyl-2-methyl-3-indolylacetic acid derivative. More particularly, it relates to a method of preparing the compound of the Formula I:

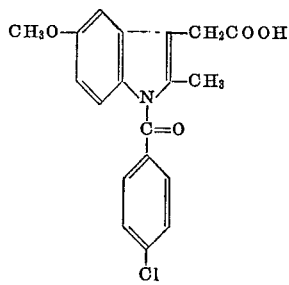

and to new intermediates used in said method. The compound of Formula I is disclosed and claimed in U.S. Patent 3,161,654, issued Dec. 15, 1965, to Shen.

In the Shen patent, the 1-p-chlorobenzoyl-2-methyl-3-indolylacetic acid of Formula I is prepared by a series of reactions in which a 2-methyl-3-indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide a new method for obtaining this compound. It is another object of this invention to provide new intermediates useful in said method. Other objects will be apparent from the ensuing description of this invention.

In accordance with this invention, it has been discovered that the compound of Formula I can be prepared by treatment of a compound of the Formula II:

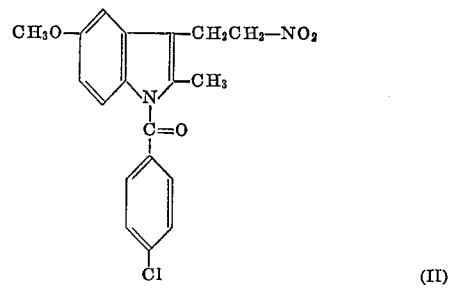

with a reagent capable of converting the 3-nitroethyl group to an acetic acid side chain. Such reagents are generally strong acids such as concentrated hydrochloric acid, sulfuric acid, p-toluenesulfonic acid, methanesulfonic acid or the like. Reaction can be conducted at a temperature anywhere between —10° and 150° C., but it is preferable to maintain the temperature in the range of 0° to 10° C. Time and temperature are interdependent so that use of higher temperatures gives the product in shorter reaction times.

The starting material of Formula II is a new compound. It can be obtained by reaction of a para-substituted phenylhydrazine hydrochloride and 5-nitro-pentan-2-one. The hydrazine and the ketone condense to give the indole of the Formula III:

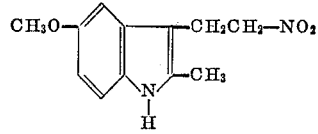

The indole of Formula III is 1-p-chlorobenzoylated by treatment with sodium hydride and p-chlorobenzoyl chloride to give the starting compound of Formula II.

The following examples are presented to further illustrate the present invention.

EXAMPLE 1

A mixture of 17.4 g. of p-methoxyphenylhydrazine hydrochloride and 15.0 g. of 5-nitro-pentan-2-one was heated at reflux in 100 ml. of t-butanol for 6 hours. The solution was concentrated to dryness in vacuo. The residue was then dissolved in chloroform and the chloroform solution was washed with water, dried and concentrated to give 2-methyl-3-(2'-nitroethane)-5-methoxyindole.

EXAMPLE 2

The 2-methyl-3-(2'-nitroethane)-5-methoxyindole of Example 1 (10.0 g.) was dissolved in DMF containing 10% excess of sodium hydride. p-Chlorobenzoyl chloride (1.05 equivalents) was slowly added to the slurry at 0°–5° C. The mixture was stirred at 0°–5° C. for 2 hours. Slow addition of 100 ml. of 5% aqueous acetic acid decomposed the excess sodium hydride. The mixture was diluted with 100 ml. of water and extracted with chloroform. The chloroform was washed with water and dried. Concentration of the chloroform gave crude 1-p-chlorobenzoyl-2-methyl-3-(2'-nitroethane)-5-methoxyindole.

EXAMPLE 3

1-p-chlorobenzoyl-2-methyl-3-(2'-nitroethane)-5-methoxyindole (2.0 g.) was stirred in concentrated hydrochloric acid for 24 hours at 0°–10° C. The mixture was diluted with water and the precipitate filtered and dried. The crude product was dissolved in hot t-butanol, treated with 0.2 g. of Darco-G-60 activated charcoal and filtered. Cooling to room temperature gives substantially pure 1-p-chlorobenzoyl-2-methyl-5-methoxy-3-indolylacetic acid.

Alternatively, the process for Example 3 could have been accomplished with such catalysts as sulfuric acid, p-toluenesulfonic acid or methanesulfonic acid.

We claim:
1. A compound of the formula:

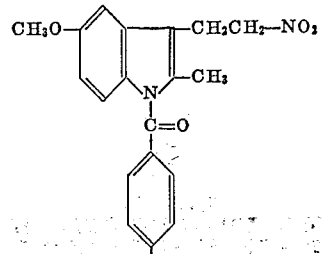

References Cited

UNITED STATES PATENTS 3,072,530  1/1963  Hofmann et al.  260—326.13 XR

ALEX MAZEL, Primary Examiner.
J. A. NARCAVAGE, Assistant Examiner.

U.S. Cl. X.R.
260—326.13